United States Patent [19]

Wehrberger et al.

[11] Patent Number: 4,716,261
[45] Date of Patent: Dec. 29, 1987

[54] SECTION INSULATOR FOR ELECTRIC RAILWAY CONTACT CONDUCTORS

[75] Inventors: Helmut Wehrberger, Roettenbach; Ulrich Summa, Bubenreuth, both of Fed. Rep. of Germany

[73] Assignee: Siemens Aktiengesellschaft, Berlin & Munich, Fed. Rep. of Germany

[21] Appl. No.: 867,103

[22] Filed: May 23, 1986

[30] Foreign Application Priority Data

Jun. 7, 1985 [DE] Fed. Rep. of Germany ... 8516717[U]

[51] Int. Cl.$^4$ .............................................. B60M 1/18
[52] U.S. Cl. ..................................... 191/39; 191/33 R
[58] Field of Search ........................... 191/39, 33 R; 174/140 S

[56] References Cited

U.S. PATENT DOCUMENTS

| Re. 18,863 | 6/1933 | McCafferty | 191/39 |
| 1,705,689 | 3/1929 | Swars | 191/39 |
| 4,406,930 | 8/1983 | Menhorn | 191/39 |

FOREIGN PATENT DOCUMENTS

| 1007796 | 5/1947 | Fed. Rep. of Germany | 191/39 |
| 956237 | 1/1957 | Fed. Rep. of Germany | 191/39 |
| 3045258 | 8/1982 | Fed. Rep. of Germany | |
| 566562 | 1/1945 | United Kingdom | 191/39 |

Primary Examiner—James T. McCall
Attorney, Agent, or Firm—James G. Morrow

[57] ABSTRACT

The overhead contact conductor of an electric railway has sections where one conductor ends and another begins. The ends of two contact conductors are fastened to a section insulator having two insulation strips between which are arranged two arc horns. The insulation strips are constructed of fiber-reinforced plastic. In order to provide increased creep resistance, the lower sides of the insulation strips are positioned above the contact conductor plane and each of the insulation strips is connected with an upright contact bar, the length of which essentially spans the gap between the arc horns. By using spacers, the contact bars are arranged on the insulation strip in such a way that the lower side of the contact bars forms a contact surface for the electric railway current collector, and not the lower side of the insulating strips.

6 Claims, 4 Drawing Figures

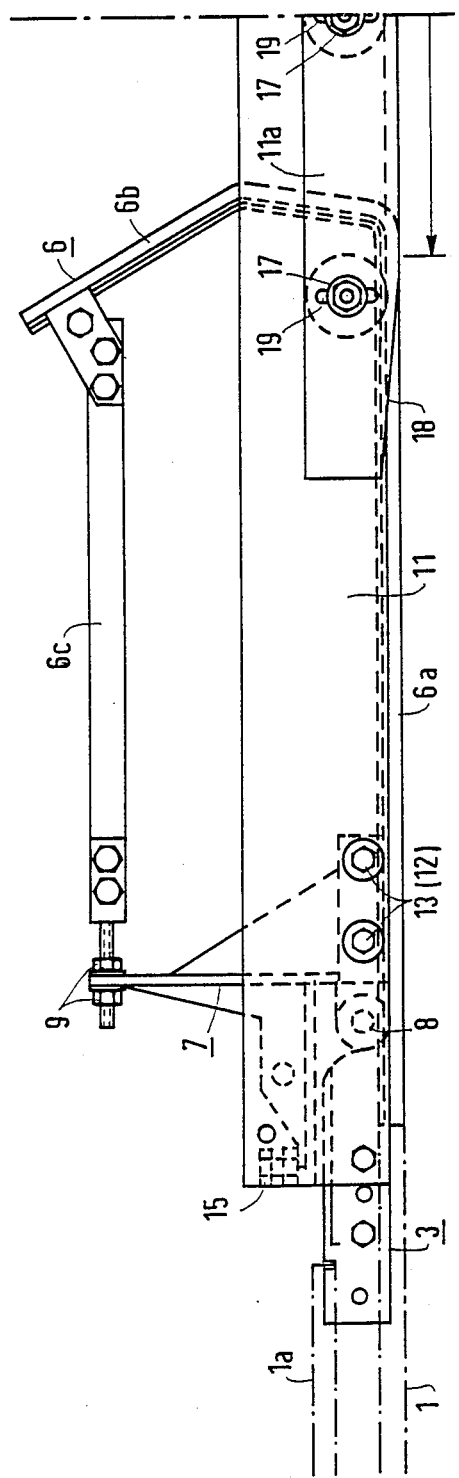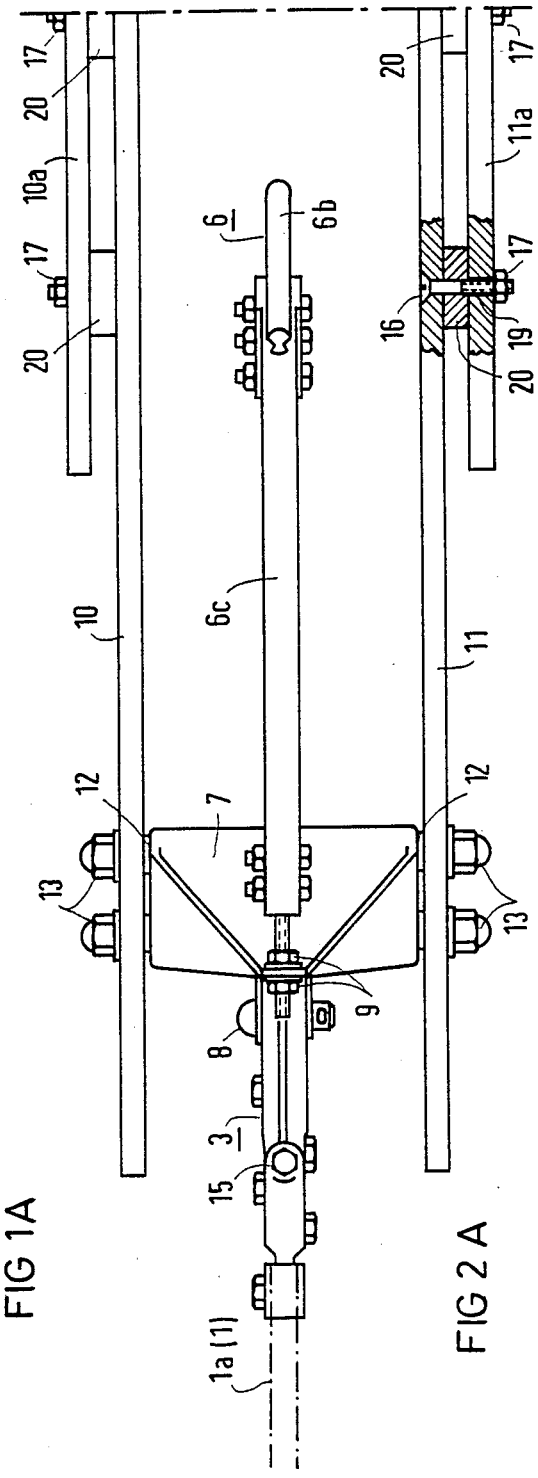

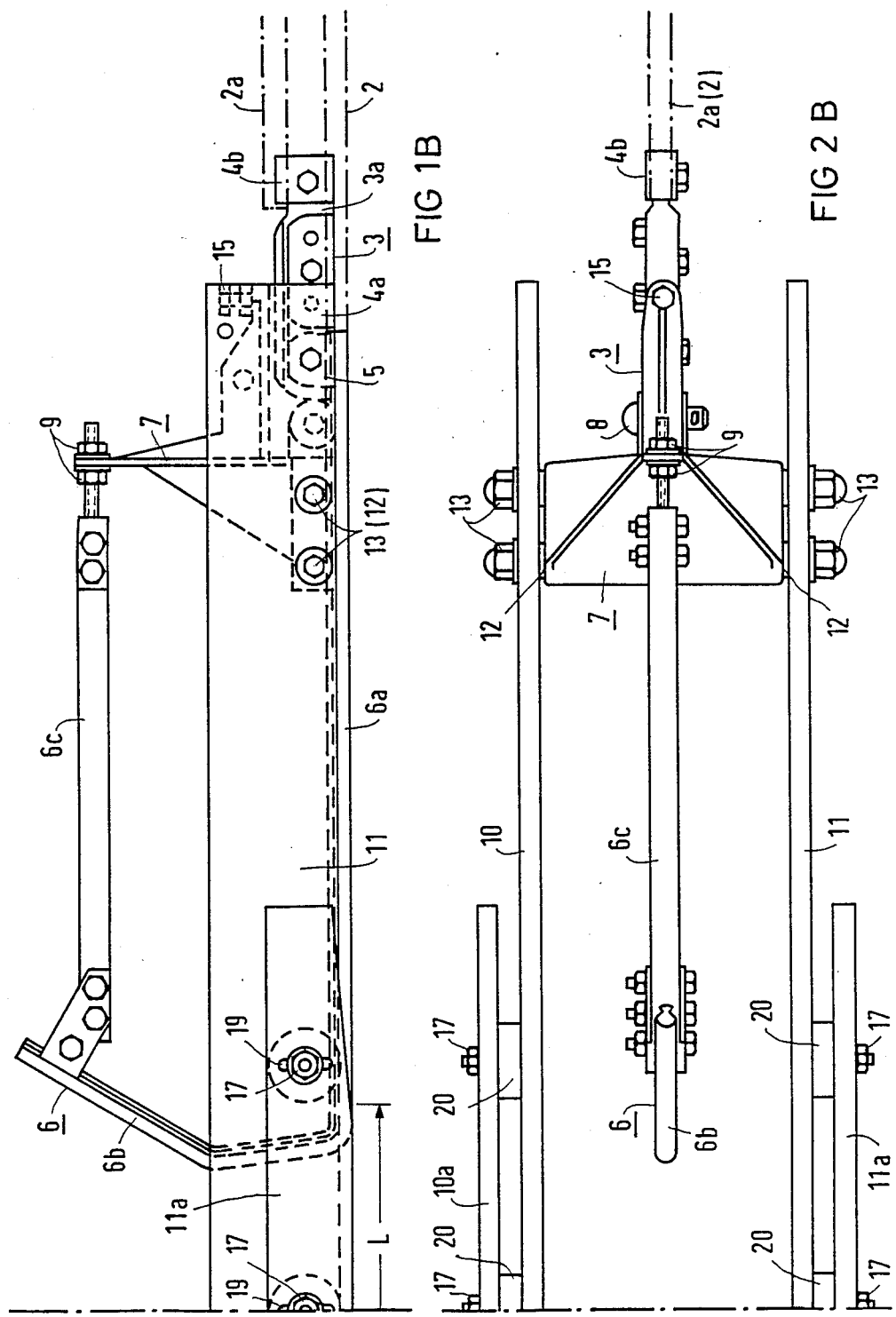

SECTION INSULATOR FOR ELECTRIC RAILWAY CONTACT CONDUCTORS

FIELD OF THE INVENTION

The invention relates to electric railway power conductors and more particularly to a section insulator for electric railway contact conductors, where the ends of two overhead contact conductors are each secured to two upright insulation strips.

BACKGROUND OF THE INVENTION

A known section insulator, having insulation strips which are contact strips, is described in Fed. Rep. of Germany Pat. No. 30 45 258. While providing uniform contact properties, said known section insulator features high mechanical strength as well as a high degree of rigidity with a resulting high degree of torsional rigidity. This configuration prevents arc, in the immediate vicinity of the two insulation strips, which would damage the insulation strips. Thus, maximum service life and reliability are attained. Under adverse conditions, however, the fabric embedded in the plastic may adversely affect the creep resistance on the part of the contact surfaces of the insulation strips because of deposits such as carbon dust from the wear of the collector strips of the current collector.

SUMMARY OF THE INVENTION

It is the object of this invention to prevent such impairments of creep resistance. It is a second object of this invention to provide a more maintainable section insulator by improving adjustability and interchangeability of the section insulator parts.

Briefly stated in accordance with one aspect of the invention, the foregoing object is achieved by providing a section insulator of the type described above having the lower sides of the insulation strips located above the contact conductor plane and each insulation strip linked by an upright contact bar, the length of which essentially spans only the gap between the arc horns, whereby the contact strips are arranged in planes parallel to the insulation strips by means of spacers, in such a way that the lower side of the contact bars forms a sliding contact surface for the current collector.

In this fashion, not only is the creep resistance increased, but greater ease of adjustability of those components which require adjustment with reference to the contact conductor plane, and greater ease of interchangeability, are introduced, which translate into reduced assembly time and maintenance time requirements.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 1A in left-half side view of the section insulator;

FIG. 1B is a right-half side view of the section insulator; and

FIG. 2A is a left-half top view of the section insulator; and

FIG. 2B is a right-half top view of the section insulator.

DESCRIPTION OF A PREFERRED EMBODIMENT

In FIG. 1A the end portion of a contact conductor of a contact conductor segment is represented by 1. In FIG. 2A the end portion of a contact conductor segment is represented by 2. These ends are linked by an insulated connection formed by the section insulator. The section insulator features two contact conductor terminal clamps 3 to accommodate the ends 1, 2 of the contact conductors which are secured by clamping jaws 4a on the clamping device 3a of the contact conductor terminal clamp 3. Also provided on the clamping device 3a of the contact conductor terminal clamp 3 is a clamping jaw 4b to accommodate a short wire section 1a or 2a, which is clamped to the contact conductor and permits a smooth transition as a current collector passes over. Moreover, a clamping jaw 5 is mounted to the clamping device 3a of the contact conductor terminal clamp 3 for purposes of clamping on the contact runner 6a of an arc horn 6.

A bolt 8 is used to connect a support member 7 to each of the clamping device 3a in order to permit adjustment. Located on this support member 7 are horizontal slots which permit mounting of the two insulation strips 10, 11 by means of threaded bolts 12 and nuts 13. Said insulation strips 10, 11 are arranged in an upright position, parallel to each other and to the side of the arc horns 6, also shown in FIG. 2, in such a way that the insulator strips 10, 11 can be fastened to the support members 7 by means of the threaded bolts 12. The insulation strips 10, 11 are arranged with their flat sides perpendicular to the collector shoes of the current collector. Both the contact conductor terminal clamp 3 and the support member 7 are constructed from an alloy of copper, tin and silicon. Thus, a high degree of corrosion resistance along with great strength are attained.

The insulation strips 10, 11 consist of fiber-reinforced plastic, particularly fiber glass reinforced, unsaturated polyester.

The arc horns 6, which feature the same cross-section as the contact conductor, are approximately U-shaped, whereby one leg of the U shape forms the contact runner 6a for the current collector, while the other leg of the U-shape forms an adjustment bracket 6c which leads back to the support member 7, and the bar connecting the two legs forms the approximately V-shaped arc guide 6b.

The bars of the arc horns 6 which form the arc guides 6b are arranged in such a way that the tips of the V-shaped bars face each other and, when in operating position, are preferably located above the two insulation strips 10, 11. In this fashion, the two insulation strips 10, 11 can be forced very close together without risk of their being damaged from arcing.

The upper ends of the arc horns 6 are designed to form an insulated adjustment bracket 6c. As illustrated in FIGS. 1A and 1B, the threaded portions of the insulated adjustment brackets 6c are secured to the respective support member 7 with nuts 9 to permit adjustment. This prevents an arc from being fed by way of the support member 7 and the adjustment bracket 6c parallel to the lower contact runner 6a, thus ensuring rapid extinction of the arc. An adjustment screw 15 located on a tab of the support member 7, which is supported by the contact conductor terminal clamp 3, permits adjustment of the position of the contact runner 6a of the arc horns 6 along the length of the ends 1, 2 of the contact conductors.

The insulation strips 10, 11 are mounted in such a way that the lower sides are each located above the contact conductor plane and are not contacted by the collector strips of a current collector. Each upright insulation strip 10, 11 is linked by an upright contact bar 10a, 11a, whereby the length of the contact bars 10a, 11a essentially spans only the gap L between the arc horns 6. For the remaining segments of the section insulator, the contact runners 6a form the contact plane. Using spacers 20, the contact bars 10a and 11a are each arranged on an insulation strip 10 or 11 in such a way that the narrow lower side provides a contact surface for an electric railway current collector. These contact bars are positioned in planes parallel to the insulation strips on the outer sides of both the insulating strips and the current collector when passing over.

The contact bars 10a, 11a are each held in position by countersunk screws 16 to a single insulation strip 10, 11. The countersunk screws 16 are passed from inside to outside through openings located in the insulation strips 10, 11, in the spacers 20 formed by insulating washers and in the contact bars 10a and 11a, and are secured with nuts 17.

When passing over the section insulator, the current collector first slides over the shank of the arc horn 6 which forms the contact runner 6a. The contact bars 10a, 11a are beveled on both ends to form contact surfaces 18 for this current collector. This keps the current collector away from insulation strips 10, 11 and in position to make contact with the contact runner 6a of the next section.

For the sake of convenience, provided openings 19 located in the contact bars 10a, 11a are designed as vertical slots, thus permitting time-saving vertical adjustment by a simple process of slackening and retightening of nuts 17.

The contact bars 10a, 11a are made of a type of insulation, preferably of the same material as the insulation strips.

In some applications, however, it is advantageous to produce the contact bars which serve as collector shoes, and the insulation strips of different materials in order to provide maximum wear resistance in the case of the contact bars as well as maximum tensile and bending strength in the case of the insulation strips. Where required for wear and strength the contact bars may also be made of metal.

It will now be understood that there has been disclosed an improved section insulator for electric railway contact conductors without the danger of developing creepage paths. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claaimed as new and desired to be secured by Letters Patent of the United States is:

1. A section insulator for electric railway contact conductors having the ends of two contact conductors each secured to a first upright insulation strip and a second upright insulation strip by means of a respective contact conductor terminal clamp and a respective support member; the insulation strips are constructed of fiber-reinforced plastic; two arc horns with an approximate U-shape attached between the two insulation strips to the support members, one leg of each arc horn forming a runner which is contacted by an electric railway current collector, and the other leg of each arc horn forming an adjustment bracket connected back to its respective support member; and a contact runner portion of each arc horn connecting the two legs forming an approximately V-shaped arc guide, the improvement comprising:

a first upright contact bar and a second upright contact bar for providing a contact surface for the current collector at the space between the runners of the arc horns, wherein the first upright contact bar is connected to the first upright insulation strip and the second upright contact bar is connected to the second upright insulation strip; and a plurality of spacers for separating the upright contact bars from the upright insulator strips;

the bottom side of each upright insulation strip located above the contact surface for the current collector.

2. The section insulator in accordance with claim 1, wherein the upright contact bars are beveled on both ends to provide contact surfaces for the current collector.

3. The section insulator in accordance with claim 1, wherein each upright contact bar is adjustably connected to each respective insulation strip in the vertical direction.

4. The section insulator in accordance with claim 3, wherein the upright contact bars have slots therein to permit adjustment in the vertical direction.

5. The section insulator in accordance with claim 1, wherein the upright contact bars are constructed of an insulating material.

6. The section insulator in accordance with claim 1, wherein upright contact bars are constructed of a metal.

* * * * *